United States Patent Office 3,393,781
Patented July 23, 1968

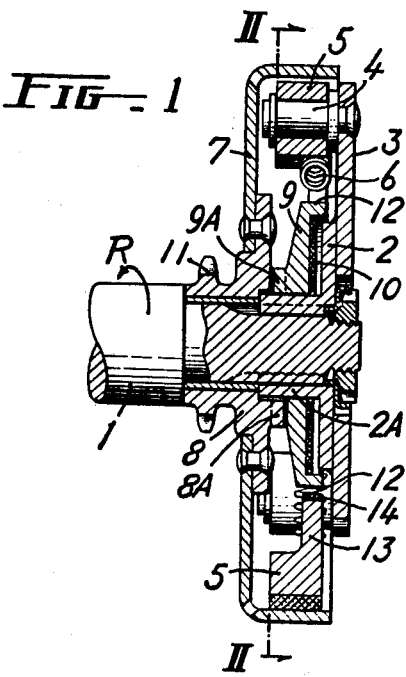
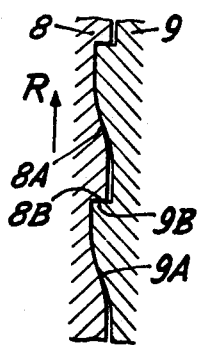
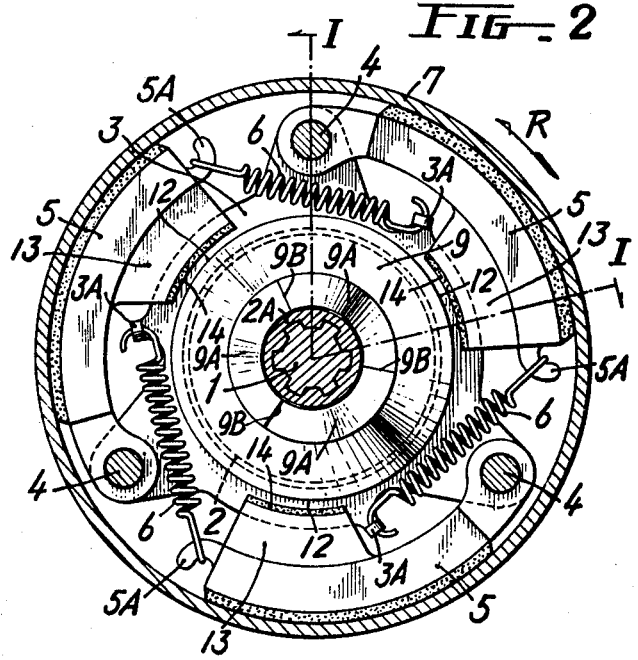

3,393,781
CENTRIFUGAL AND ONE-WAY CLUTCHES
Atsutami Miura, Yamato-machi, Japan, assignor to Kabushiki Kaisha Honda Gijutsu Kenkyusho, Saitama-ken, Japan
Filed Mar. 22, 1967, Ser. No. 625,094
Claims priority, application Japan, Mar. 28, 1966, 41/18,734
7 Claims. (Cl. 192—65)

ABSTRACT OF THE DISCLOSURE

An automatic clutch in which a clutch plate connected to a driving plate supporting a centrifugal clutch shoe is fixed to a drive shaft, and a driven plate connected to a clutch drum which is to be in frictional connection with said clutch shoe is loosely mounted on said drive shaft so as to be free only in rotation. One side surface of a clutch member, mounted loosely on the drive shaft so as to be rotatable therearound and slidable therealong, is arranged so that it is removably engageable with the clutch plate, there being provided between the other side surface of the clutch member and the driven plate, a thrust developing means for thrusting the clutch member against the clutch plate when the driven plate becomes the driving side as for example, when a drive means for the drive shaft is to be started.

Brief summary of the invention

The present invention relates to an automatic clutch of the type in which a drive shaft and a driven plate loosely mounted thereon are frictionally connected by a centrifugal clutch shoe rotating with said drive shaft.

An object of the invention is to provide a simple and effective clutch of the above type which is operative to rotate the drive shaft when a back load is applied to the driven plate.

Thereby another object of the invention is satisfied in that it becomes possible to turn over an engine to be started, which is to drive the drive shaft, by applying a force on the output side to drive the driven plate.

The application of such force is also effective when the engine is operating to apply a braking force to the engine.

The above and other objects according to the invention are achieved by the provision of a clutch member which is loosely mounted on the drive shaft for free rotation and axial displacement, said clutch member having a surface facing the driven plate which together therewith forms a driving connection and a thrust developing means by which when back load is applied to the driven plate the clutch member is axially displaced to frictionally engage a clutch plate secured to the drive shaft whereby driving action is transferred from the driven plate to the drive shaft via said clutch member. When the engine is started and the drive shaft is driven thereby, the clutch member returns to its normal axial position on the drive shaft and driving action is transferred from the drive shaft to the driven plate via the centrifugal clutch shoe.

Brief description of the drawing

FIGURE 1 is a sectional view taken along the line I—I in FIGURE 2;
FIGURE 2 is a sectional view taken along the line II—II in FIG. 1; and
FIGURE 3 is an enlarged development of engaging claw portions of a clutch plate and a driven plate.

Detailed description of the invention

Referring to the drawing, numeral 1 denotes a rotatable shaft such as a crank shaft connected to an internal combustion engine. A tubular portion 2A of a clutch plate 2 is fixed to shaft 1. Numeral 3 denotes a driving plate welded to the clutch plate 2, and one end of a centrifugal clutch shoe 5 is pivotally supported by a pin 4 secured in the plate 3. A return spring 6 connects the other end 5A of shoe 5 with a hook 3A on the driving plate 3 and the spring urges the shoe 5 to an inwardly pivoted position. Numeral 7 is a clutch drum which, under certain circumstances to be described later, is to be in frictional engagement with the centrifugal clutch shoe 5. A driven plate 8 is fixed to a central portion of drum 7 and is mounted on the shaft 1 so as to be fixed axially thereon but free in rotation. A clutch member 9 is mounted slidably in both rotation and axial movement on the tubular portion 2A of the clutch plate 2. The opposed faces of the driven plate 8 and the clutch member 9 are provided with a thrust developing means constituted by a claw surface on plate 8 having shoulders 8B with an inclined surface 8A between the shoulders and a claw surface on plate 9 having shoulders 9B with an inclined surface 9A between the shoulders. Additionally a frictional plate 10 is fixed to the clutch member 9 as for example, by an adhesive, the frictional plate 10 being in contact with clutch plate 2 under certain circumstances as will be described later. Numeral 11 is a gear which is integral with the driven plate 8 and the gear 11 is connected to a driven member such as a wheel of a vehicle. A portion 13 of the centrifugal clutch shoe 5 projects inwardly and a frictional plate 14 is fixed to the inner surface of portion 13 for being in frictional engagement with the outer surface 12 of the clutch member 9 as will be described later.

The operation of the clutch will next be described as follows:

In order to start the internal combustion engine (not shown), the driven plate 8 is driven in the direction of arrow R by turning the driven member at the output side of the clutch. The claw surface with the inclined surface 8A is rotated in the same direction. At this time, however, each centrifugal clutch shoe 5 is in its inwardly pivoted position under the action of its associated spring 6, so that the friction plate 14 is in frictional engagement with the periphery 12 of the clutch member 9 to resist turning of the clutch member 9. Accordingly, the inclined surface 8A of the driven plate 8 is moved in the direction of arrow R in relation to the inclined surface 9A of the clutch member 9 whereby the clutch member 9 is moved to the right in FIG. 1. Thereby, the clutch member 9 is pushed against the clutch plate 2 so that they are in frictional engagement via frictional plate 10 whereby the rotation of the driven plate 8 is transmitted to the shaft 1 through the engagement between the inclined surfaces 8A and 9A and the above-mentioned frictional connection to cause the engine to turn over and start.

The above operation is similarly effected when an engine brake action is produced by a back load applied to the driven member on the output side.

After the engine has been started, but when the rotational speed of the moving shaft 1 is low and not enough to bring the centrifugal clutch shoes 5 into friction connection with the clutch drum 7, the friction plate 14 is in frictional connection with the clutch member 9, so that the clutch member 9 tends to be rotated in the direction of arrow R. Thereby, the shoulders 9B of the member 9 become engaged with the shoulders 8B of the driven plate 8 and the clutch 9 slides on the periphery of the tubular portion 2A to the left in FIG. 1. Accordingly, the inclined surfaces 8A and 9A are not pressed together, so that the clutch member 9 and clutch plate 2 are not brought into frictional connection.

If, then, the rotational speed of the moving shaft 1 is increased and the centrifugal clutch shoe 5 is brought into frictional connection with the clutch drum 7, the frictional connection between the friction plate 14 and the clutch plate 7 is released at the same time, and thus every part rotates integrally.

As described above, the automatic clutch of the present invention is such that the clutch plate 2 connected to the driving plate 3 supporting the centrifugal clutch shoe 5 is fixed to the moving shaft 1, and the driven plate 8 connected to the clutch drum 7 is mounted on the moving shaft 1 so as to be free only in rotation, and one side surface of the clutch member 9 mounted loosely on the moving shaft 1 is arranged to be in frictional connection with the clutch plate 2, the other side surface thereof and the clutch plate 8 being respectively provided with the claw surface 9B having inclined surface 9A and the claw surface 8B having inclined surface 8A. In this clutch, in order to bring the clutch member 9 thereof into operative position by the application of a back load when the centrifugal clutch shoe 5 is not positioned in frictional connection with the clutch drum 7, the inner surface of the shoe 5 is in frictional engagement with the periphery 12 of the clutch member 9 so that the frictional engagement of the clutch member 9 with the clutch plate 2 can be securely obtained and the operation thereof made smooth, whereby the construction may be very simple and the number of the parts kept to a minimum.

What is claimed is:

1. An automatic clutch comprising a rotatable drive shaft, a clutch plate secured to said drive shaft, a driving plate secured to said clutch plate, a clutch shoe pivotally mounted on said driving plate for undergoing outward pivotal movement as the driving plate undergoes rotation with the drive shaft, a driven plate loosely mounted on said drive shaft so as to be free in rotation, a clutch drum secured to said driven plate and encircling said clutch shoe so as to be in frictional engagement therewith as the clutch shoe moves outwards when the drive shaft is rotated, a clutch member loosely mounted on the drive shaft for free axial and rotational movement, said clutch member being positioned between the clutch plate and the driven plate and having opposite surfaces facing respective plates, and thrust developing means on the driven plate and the surface of the clutch member facing the driven plate for producing driving engagement between the clutch member and the driven plate and for producing axial displacement of the clutch member towards said clutch plate and consequent frictional driving engagement therewith as the driven plate is externally driven.

2. An automatic clutch as claimed in claim 1 comprising spring means between the clutch shoe and said driving plate for urging the clutch shoe to an inwardly pivoted position, said clutch shoe having an inner surface which in said inwardly pivoted position is in contact with the clutch member, said clutch shoe moving outwards against the action of the spring means due to the effect of centrifugal force as the driving plate undergoes rotation.

3. An automatic clutch as claimed in claim 2 comprising friction developing means between the inner surface of the clutch shoe and the clutch member and secured to one of the latter.

4. An automatic clutch as claimed in claim 1 comprising friction developing means between the clutch member and the clutch plate and secured to one of the latter.

5. An automatic clutch as claimed in claim 1 wherein said thrust developing means is constituted by shoulders and inclined surfaces between said shoulders on the facing surfaces of the clutch member and the driven plate.

6. An automatic clutch as claimed in claim 1 comprising friction developing means between the clutch drum and the clutch shoe and secured to one of the latter.

7. An automatic clutch as claimed in claim 5 wherein said shoulders and inclined surfaces are arranged on the facing surfaces of the clutch member and the driven plate so that the inclined surfaces on said facing surfaces are in driving engagement when the driven plate is externally driven whereby driving effort can be transferred to said drive shaft via the clutch member, and the clutch plate, whereas when the driven shaft is operative to drive the driven shaft, the shoulders of said facing surfaces are in engagement and the clutch member is displaced from the clutch plate.

References Cited

UNITED STATES PATENTS 2,005,250 6/1935 Wemp _____ 192—105 X
2,275,046 3/1942 Harris _____ 192—105 X BENJAMIN W. WYCHE III, *Primary Examiner.*